United States Patent
Erhardt et al.

(10) Patent No.: US 6,686,703 B2
(45) Date of Patent: Feb. 3, 2004

(54) HIGH FREQUENCY ELECTRONIC BALLAST

(75) Inventors: Robert A. Erhardt, Schaumburg, IL (US); Oscar J. Deurloo, Arlington Heights, IL (US); Jerzy Janczak, Eindhoven (NL); Hendrik A. Van Esveld, Geldrop (NL); Winston D. Couwenberg, Veldhoven (NL); Ronald H. Van Der Voort, Helmond (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 31 days.

(21) Appl. No.: 10/043,586

(22) Filed: Jan. 10, 2002

(65) Prior Publication Data

US 2003/0127993 A1 Jul. 10, 2003

(51) Int. Cl.[7] ................................................ H05B 37/02
(52) U.S. Cl. ..................... 315/247; 315/209 R; 315/224
(58) Field of Search ................................. 315/246, 247, 315/209 R, 224

(56) References Cited

U.S. PATENT DOCUMENTS

| | | | |
|---|---|---|---|
| 4,373,146 A | | 2/1983 | Bonazoli et al. |
| 5,121,034 A | * | 6/1992 | Allen et al. ................. 315/246 |
| 5,198,727 A | * | 3/1993 | Allen et al. ................. 315/291 |
| 5,374,874 A | * | 12/1994 | Nilssen ....................... 315/219 |
| 5,382,881 A | * | 1/1995 | Farkas et al. ............... 315/307 |
| 5,469,028 A | * | 11/1995 | Nilssen ....................... 315/291 |
| 6,150,768 A | * | 11/2000 | Nilssen .................... 315/209 R |
| 6,225,754 B1 | * | 5/2001 | Horiuchi et al. ............ 315/246 |
| 6,459,213 B1 | * | 10/2002 | Nilssen ....................... 315/224 |

FOREIGN PATENT DOCUMENTS

| | | |
|---|---|---|
| DE | 42 34 358 | 2/1993 |
| EP | 0 386 990 | 3/1990 |

OTHER PUBLICATIONS

Abstract entitled *"Ignitor for High–Voltage Electric–Discharge Lamp"*, Publication No. 01–298687, Date of Publication Dec. 1, 1989, Applicant is Matsushita Electric Works Ltd.

Abstract entitled *"Discharge Lamp Lighting Device and Lighting System"*, Publication No. 07–106080, Date of Publication Apr. 21, 1995, Applicant is Toshiba Lighting & Technology Corp.

Abstract entitled *"Rare Gas Discharge Lamp Lighting Circuit and Lighting System"*, Publication No. 08–096976, Date of Publication Apr. 12, 1996, Applicant is Toshiba Lighting & Technology Corp.

Abstract entitled *"Copying Method"*, Publication No. 61–147242, Date of Publication Jul. 4, 1986, Applicant is Ushio Inc.

(List continued on next page.)

*Primary Examiner*—David Hung Vu

(57) ABSTRACT

An improved high frequency ballast is disclosed. The high frequency ballast establishes a lamp current for a gas discharge lamp during a starting operation of the gas discharge lamp wherein an operating ampere level of the lamp current facilitates a substantial achievement by the gas discharge lamp of a color specification associated with the gas discharge lamp. Thereafter, during a stable operation of the gas discharge lamp, the high frequency ballast applies a frequency modulation to an operating frequency of the lamp current and/or an amplitude modulation of the lamp current.

12 Claims, 9 Drawing Sheets

OTHER PUBLICATIONS

Abstract entitled *"Discharge Lamp Lighting Device"*, Publication No. 08–180987, Date of Publication Jul. 12, 1996, Applicant is Matsushita Electric Works Ltd.

Abstract entitled *"Power Supply"*, Publication No. 10–164851, Date of Publication Jun. 19, 1998, Applicant is Matsushita Electric Works Ltd.

Abstract entitled *"Discharge Lamp Lighting Device"*, Publication No. 09–022787, Date of Publication Jan. 21, 1997, Applicant is Tec Corp.

Abstract entitled *"Discharge Lamp Lighting Device and Lighting System"*, Publication No. 2000–235895, Date of Publication Aug. 29, 2000, Applicant is Toshiba Lighting & Technology Corp.

Abstract entitled *"Discharge–Lamp Lighting System"*, Publication No. 52–082877, Date of Publication Jul. 11, 1977, Applicant is Matsushita Electric Works Ltd.

Abstract entitled *"Ignitor for High Voltage Discharge"*, Publication No. 01–167987, Date of Publication Jul. 3, 1989, Applicant is Matsushita Electric Works Ltd.

Abstract entitled *"Driving gas discharge or fluorescent lamp—using frequency modulated supply from DC or AC source with centre frequency between 15 and 100 kHz"*, Patent No. DE4234358, Publication Date Feb. 25, 1993, Applicant is NIGG JUERG (CH).

* cited by examiner

HIGH FREQUENCY ELECTRONIC BALLAST

BACKGROUND OF THE INVENTION

1. Field of the Invention

The present invention generally relates to controlling an operation of various types of gas discharge lamps. The present invention specifically relates to an improvement in the operational performance of electronic ballast within a high frequency range of a gas discharge lamp.

2. Description of the Related Art

A high intensity discharge ("HID") gas discharge lamps as known in the art suffer from acoustic resonances when such lamps are operated within a high frequency HF operation between a few kHz and hundreds of kHz, depending on the type of lamp. However, the acoustic resonances significantly weaken within such gas discharge lamps whereby the acoustic resonance do not have negative affect on the performance of the gas discharge lamp when the gas discharge lamps are operated within a very high frequency operation that is above the highest acoustic resonance (e.g., 150 kHz for a 400 W MH lamp). A consequence of operating the gas discharge lamp in the VHF operation is a generation of electromagnetic interference. Additionally, when a gas discharge lamp is operated at HF lamp current, the electrode temperature modulation (i.e., difference in anode and cathode temperatures) will vanish. This results in a different electrode operating conditions, which could cause changes in the arc attachment on the electrode. Arc instabilities related with arc-electrode attachment have been found when 400 W MH lamps are operated on high frequencies even up to as high as 500 kHz. Also, large coil differences between individual lamps are also found when lamps are operated on high frequencies.

Back-arcing of a gas discharge lamp involves an arc attachment of the arc on the back of the electrode coil of the lamp as opposed to an ideal arc attachment of the arc on the tip of the electrode. This can affect thermal balance of the end of the arc tube, which in turn can affect the vapor pressures. Consequently, the color properties of the lamp are affected. Currently, related prior art has failed to address back-arcing.

The present invention addresses the shortcomings of the prior art.

SUMMARY OF THE INVENTION

The present invention relates to an improved high frequency ballast. Various aspects of the present invention are novel, non-obvious, and provide various advantages. While the actual nature of the present invention covered herein can only be determined with reference to the claims appended hereto, certain features, which are characteristic of the embodiments disclosed herein, are described briefly as follows.

One form of the present invention is a first method of operating a half-bridge coupled to a gas discharge lamp. First, the half-bridge is operated to establish an operating frequency of a lamp current above all acoustic resonances within a high frequency operation range of the gas discharge lamp. Second, the half-bridge is operated to apply a frequency modulation to the operating frequency.

A second form of the present invention is a second method of operating a half-bridge coupled to a gas discharge lamp. First, the half-bridge is operated to establish an operating frequency of a lamp current. Second, the half-bridge is operated to apply an amplitude modulation to the lamp current in response to a reception by the half-bridge of a drive voltage having a waveform.

A third form of the present invention is a third method of operating a half-bridge coupled to a gas discharge lamp. First, the half-bridge is operated to establish an operating frequency of a lamp current above all acoustic resonances within a high frequency operation range of the gas discharge lamp. Second, the half-bridge is operated to apply a frequency modulation to the operating frequency. Finally, the half-bridge is operated to apply an amplitude modulation to the lamp current in response to a reception by the half-bridge of a drive voltage having a waveform.

A fourth form of the present invention is a fourth method of operating a half-bridge coupled to a gas discharge lamp. First, the half-bridge is operated to provide a lamp current to the lamp during a start-up operation of the gas discharge lamp. Second, the half-bridge is operated to establish the lamp current at an operating ampere level during an arc heating phase of the gas discharge lamp. The operating ampere level is equal to or greater than a minimum run-up ampere level to thereby impede any back-arcing within the gas discharge lamp whereby the gas discharge lamp substantially achieves a color specification for the gas discharge lamp.

The foregoing forms and other forms, features and advantages of the present invention will become further apparent from the following detailed description of the presently preferred embodiments, read in conjunction with the accompanying drawings. The detailed description and drawings are merely illustrative of the present invention rather than limiting, the scope of the present invention being defined by the appended claims and equivalents thereof.

DETAILED DESCRIPTION OF THE PRESENTLY PREFERRED EMBODIMENTS

Figure 1:
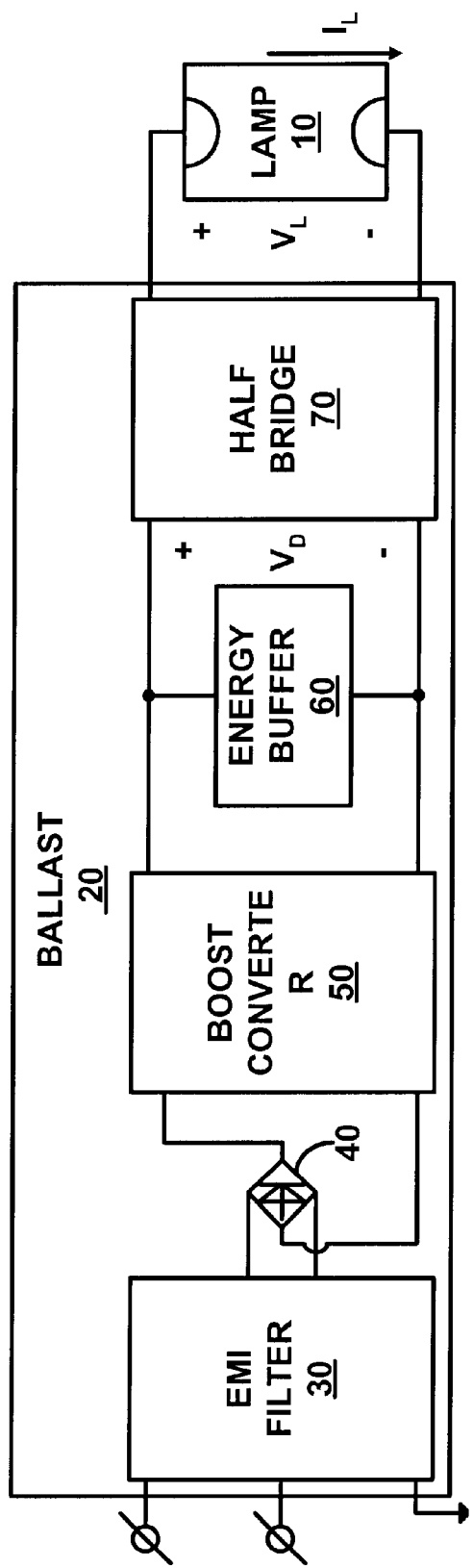
FIG. 1 illustrates one embodiment of a ballast in accordance with the present invention.

FIG. 1 illustrates a ballast 20 of the present invention for providing a lamp current $I_L$ to a conventional lamp 10. Ballast 20 comprises a electromagnetic interference filter 30, a MAINS rectifier 40, a boost converter 50, an energy buffer 60, and a half-bridge 70 coupled in a conventional arrangement whereby a drive voltage $V_D$ is applied to half-bridge 70.

Figure 2:
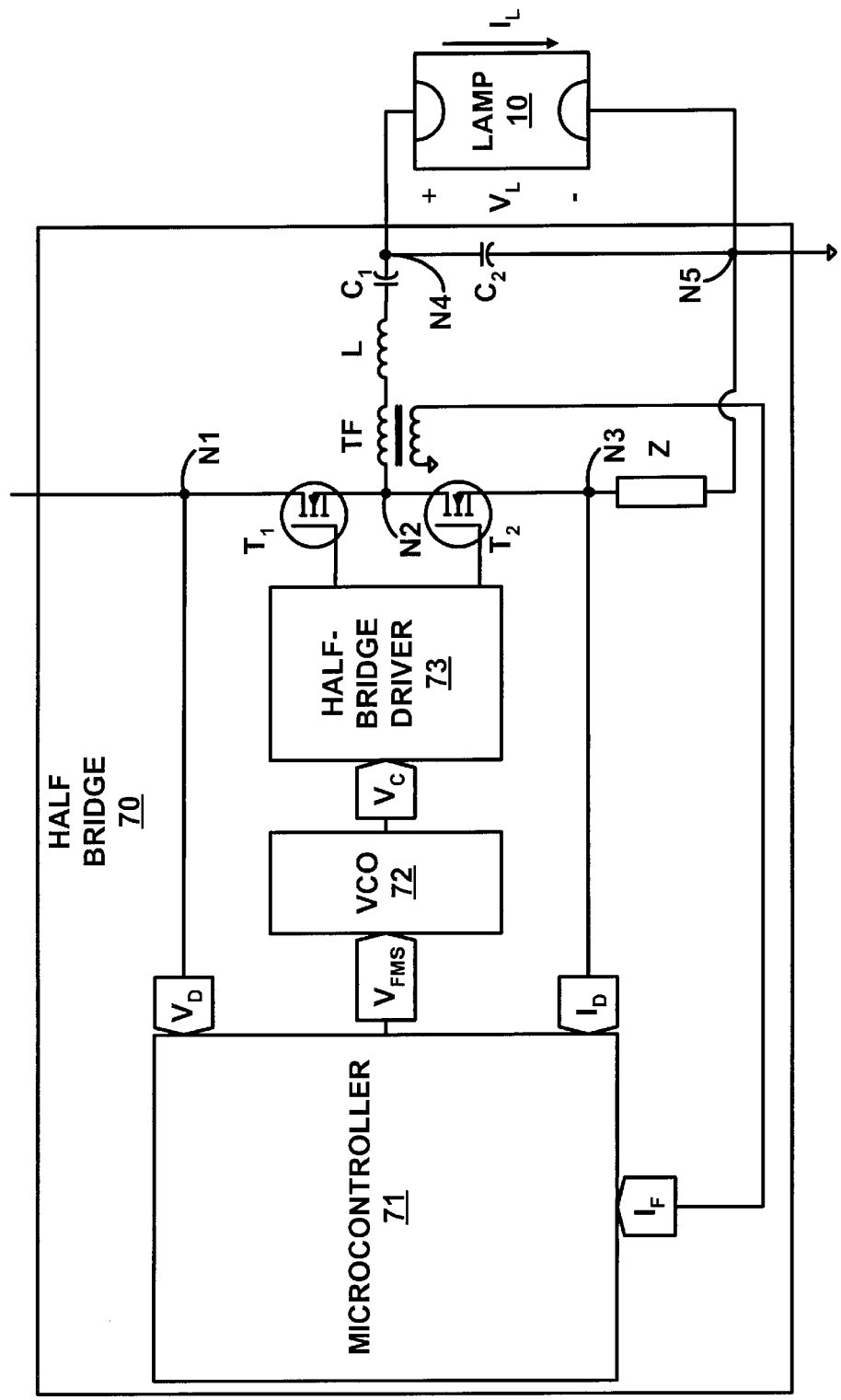
FIG. 2 illustrates one embodiment of a half-bridge in accordance with the present invention.

FIG. 2 illustrates half-bridge 70 including a micro-controller 71, a voltage controlled oscillator 72 ("VCO 72"), a half-bridge driver 73, a transistor $T_1$, a transistor $T_2$, a transformer TF, an inductor L, a capacitor $C_1$, a capacitor $C_2$, and an impedance component Z. Micro-controller 71 and a drain of transistor $T_1$ are coupled to a node N1 to receive drive voltage $V_D$. A source of transistor $T_1$, a drain of transistor $T_2$ and transformer TF are coupled to a node N2. Micro-controller 71, a source of transistor $T_2$ and impedance component Z are coupled to a node N3 whereby micro-controller 71 receives a drive current $I_D$. Micro-controller 71 is also coupled to transform TF to receive a feedback current $I_F$. Transformer TF, inductor L and capacitor $C_1$ are coupled in series. Capacitor $C_1$, capacitor $C_2$ and lamp 10 are coupled to a node N4 with capacitor $C_2$ and lamp 10 coupled in parallel between node N4 and a node N5.

VCO 72 conventionally establishes an operating frequency of lamp current $I_L$ above all acoustic resonances within the high frequency range of operation. Micro-controller 71 comprises analog circuitry, digital circuitry, or a combination of analog circuitry and digital circuitry in generating a modulation voltage $V_{FMS}$ in response to a reception of drive voltage $V_D$, a drive current $I_D$, and a feedback current $I_F$. In response to frequency modulation voltage $V_{FMS}$, VCO 72 applies a corresponding frequency modulation to the operating frequency of lamp current $I_L$. VCO 72 provides a control voltage $V_C$ as an indication of the frequency modulation to the operating frequency of lamp current $I_L$. In response to control voltage $V_C$, half-bridge driver 73 operates transistor $T_1$ and transistor $T_2$ whereby lamp current $I_L$ is provided to lamp 10.

Micro-controller 71 determines an input power $P_{IN}$ to half bridge 70 by measuring drive voltage $V_D$ and averaging drive current $I_D$. In one embodiment, input power $P_{IN}$ is determined by multiplying both drive voltage $V_D$ and the average drive current $I_D$. The lamp voltage $V_L$ can be derived by subtracting any power losses $P_{LOSS}$ by half bridge 70 of the computed input power $P_{IN}$ and dividing this result by the lamp current $I_L$ under the following equation [1]:

$$(P_{IN} - P_{LOSS})/I_L \qquad [1]$$

Figure 3:
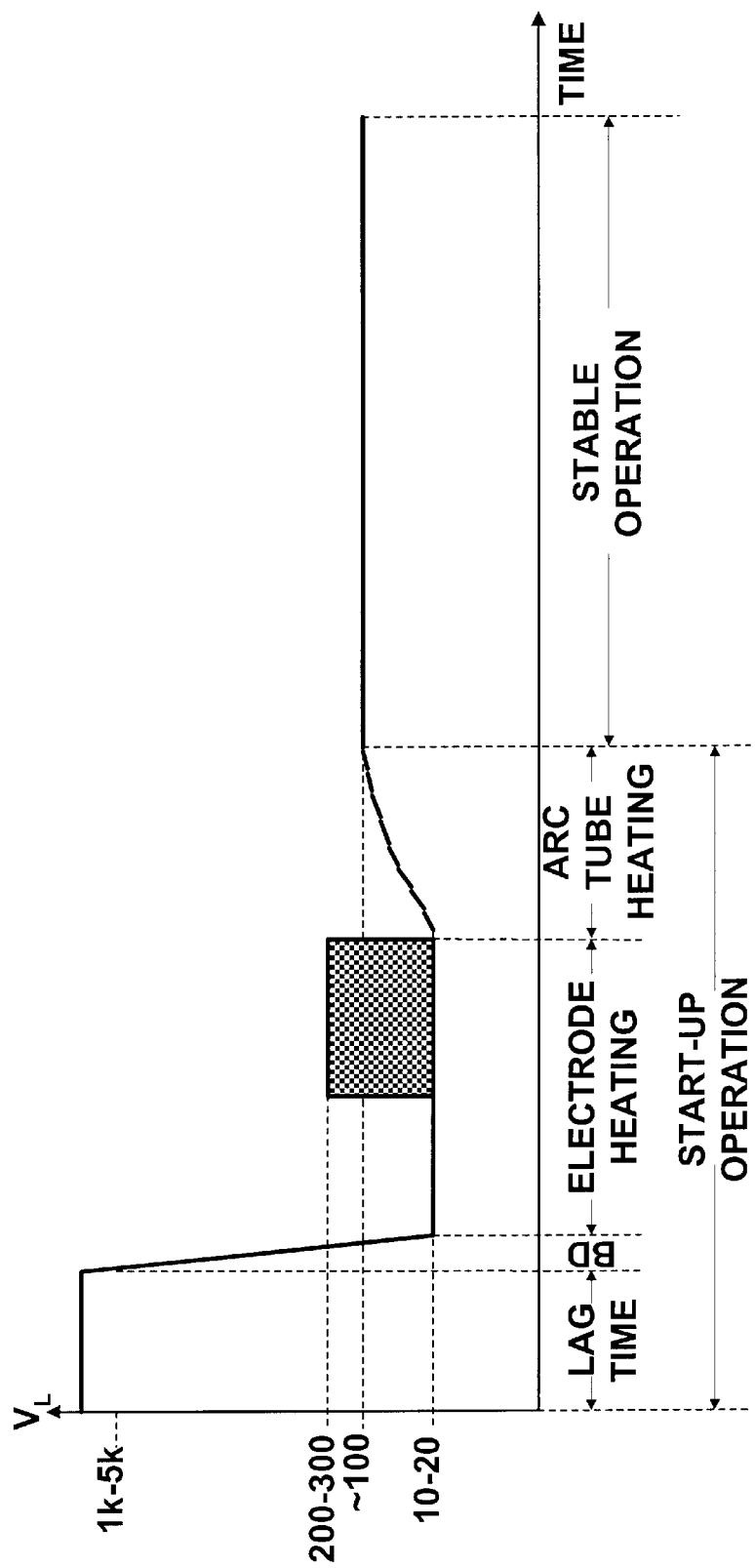
FIG. 3 illustrates an exemplary graph of a lamp voltage over time.
Figure 4:
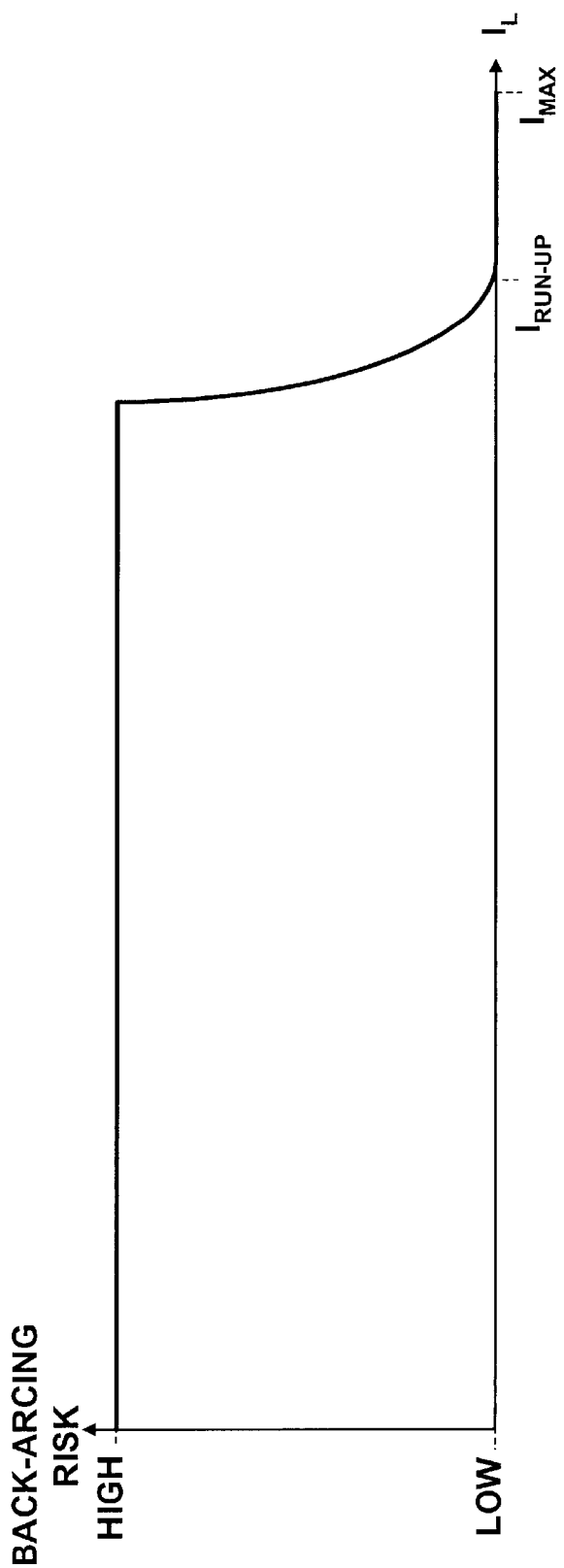
FIG. 4 illustrates an exemplary graph of a back-arcing risk vs. a lamp current.

FIG. 3 illustrates the lamp voltage $V_L$ over time. A starting operation of the gas discharge lamp 10 consists of a lag time phase, a breakdown ("BD") phase, an electrode heating phase, and an arc tube heating phase. It is imperative during the arc tube heating phase to minimize, if not eliminate, any back-arcing within the gas discharge lamp 10 to thereby facilitate a substantial achievement by the gas discharge lamp of a color specification associated with the gas discharge lamp 10. As such, micro-controller 71 establishes an operating ampere level of the lamp current $I_L$ that is equal to or greater than a run-up ampere level $I_{RUN-UP}$ as shown in FIG. 4. In one embodiment, the run-up ampere level $I_{RUN-UP}$ is 85% of a maximum ampere level $I_{MAX}$ for the lamp current $I_L$ as established for the gas discharge lamp 10.

Figure 5:
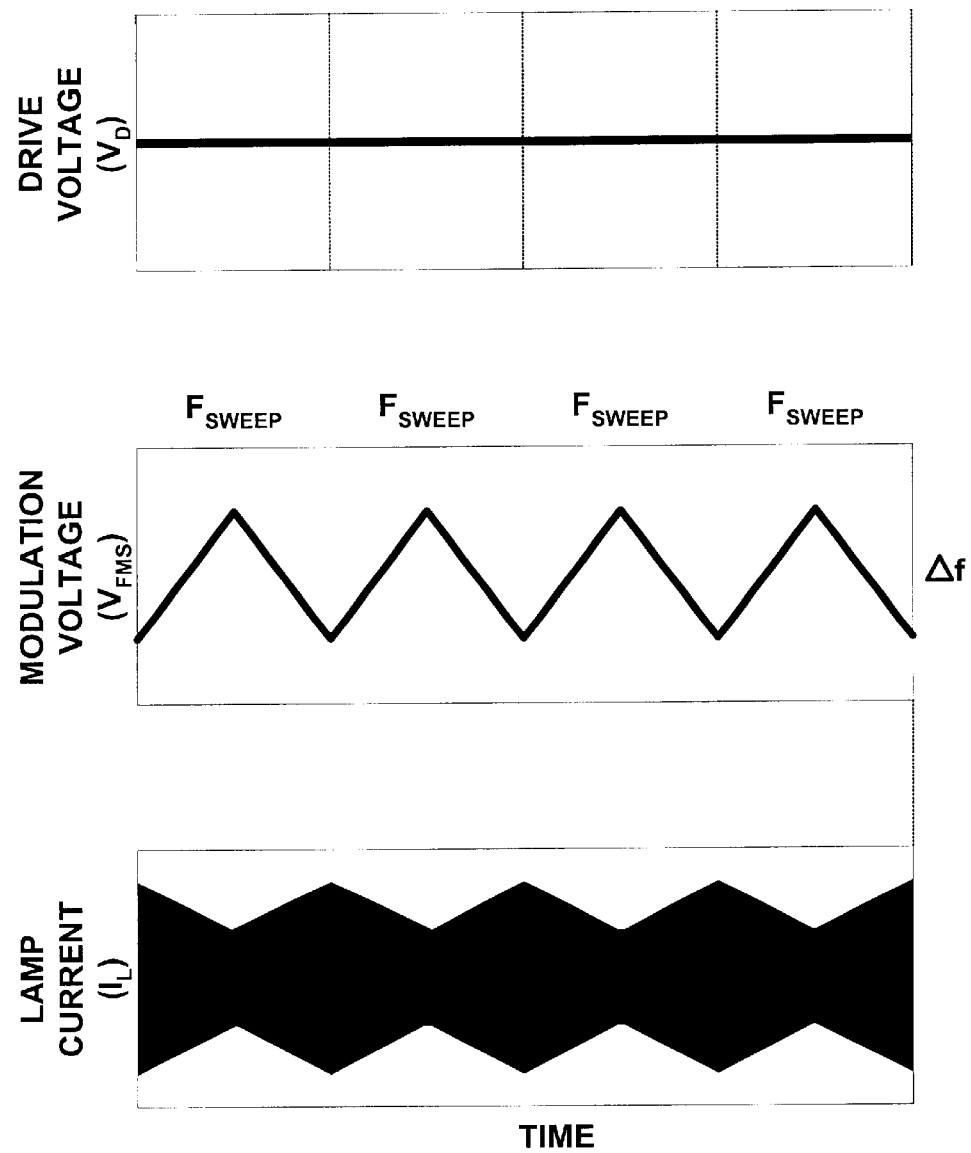
FIG. 5 illustrates a first set of exemplary graphs of a drive voltage, a modulation voltage, and a lamp current.

FIG. 5 illustrates one embodiment of drive voltage $V_D$ and modulation voltage $V_{FMS}$ having a frequency modulation $\Delta f$ (e.g., 5 kHz) and a frequency sweep $F_{sweep}$ (e.g., 200 Hz) in deriving lamp current $I_L$. The result is a stabilization of an arc (not shown) of lamp 10.

Figure 6:
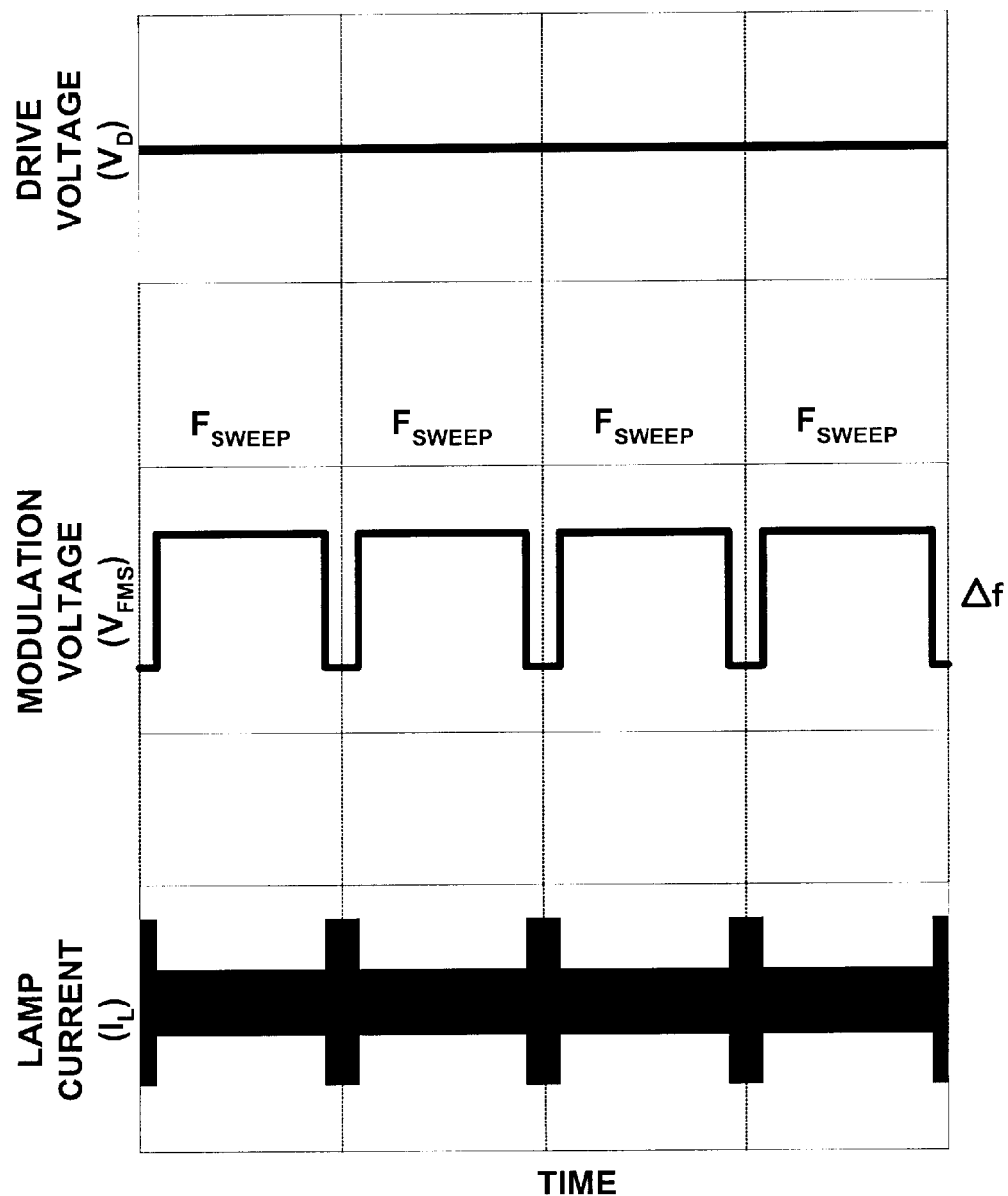
FIG. 6 illustrates a second set of exemplary graphs of the drive voltage, the modulation voltage, and the lamp current.

FIG. 6 illustrates a second embodiment of drive voltage $V_D$ and modulation voltage $V_{FMS}$ having a frequency modulation $\Delta f$ (e.g., k5 Hz) and a frequency sweep $F_{sweep}$ (e.g., 200 Hz) in deriving lamp current $I_L$.

Figure 7:
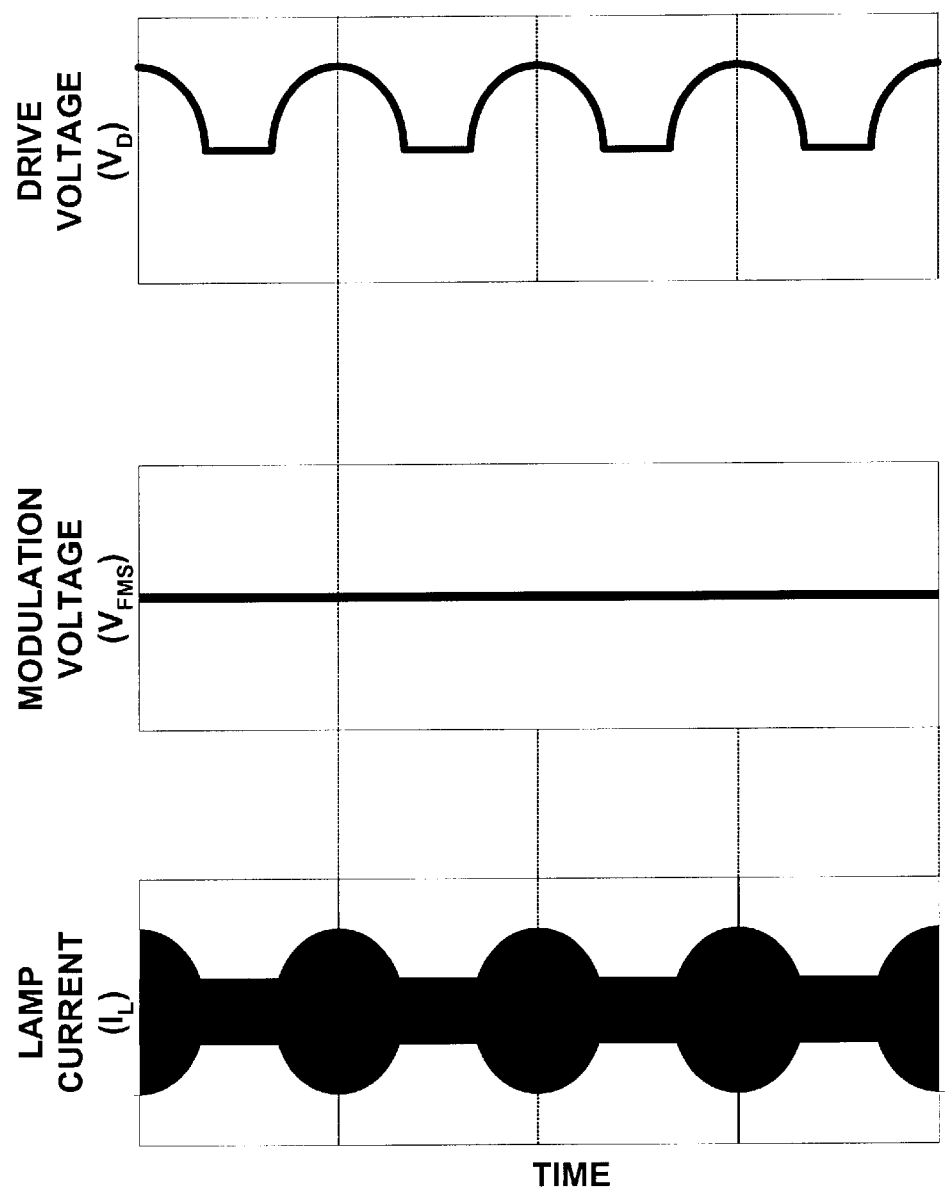
FIG. 7 illustrates a third set of exemplary graphs of the drive voltage, the modulation voltage, and the lamp current.

FIG. 7 illustrates a third embodiment of drive voltage $V_D$ having an amplitude modulation and a frequency (e.g., 120 Hz) and modulation voltage $V_{FMS}$ in deriving lamp current $I_L$. Those having ordinary skill in the art will appreciate that the ballast 20 provides drive voltage $V_D$ based upon a valley fill technique.

Figure 8:
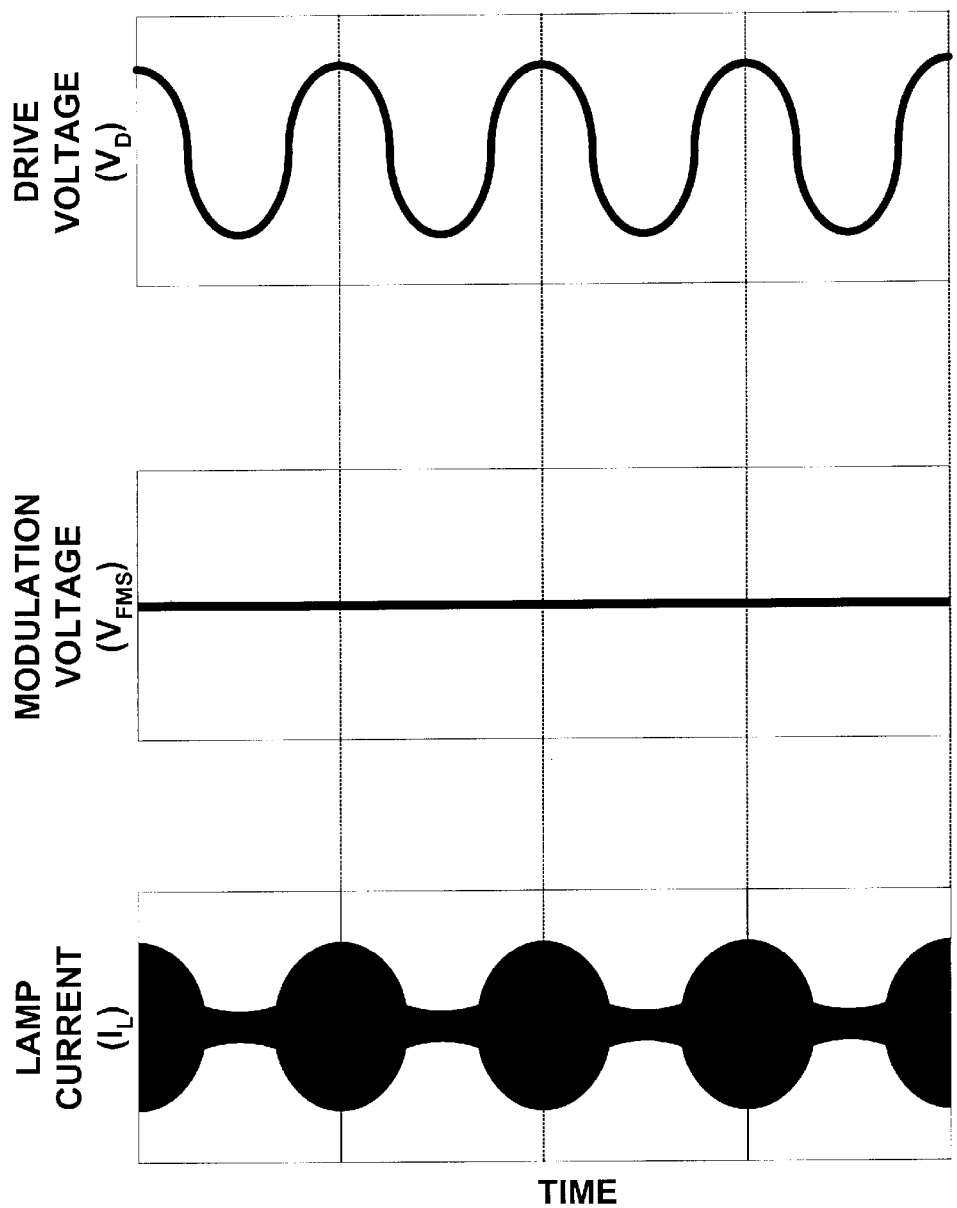
FIG. 8 illustrates a fourth set of exemplary graphs of the drive voltage, the modulation voltage, and the lamp current.

FIG. 8 illustrates a third embodiment of drive voltage $V_D$ having an amplitude modulation and a frequency (e.g., 120 Hz) and modulation voltage $V_{FMS}$ in deriving lamp current $I_L$. Those having ordinary skill in the art will appreciate that the ballast 20 provides drive voltage $V_D$ based upon a follower boost technique.

Figure 9:
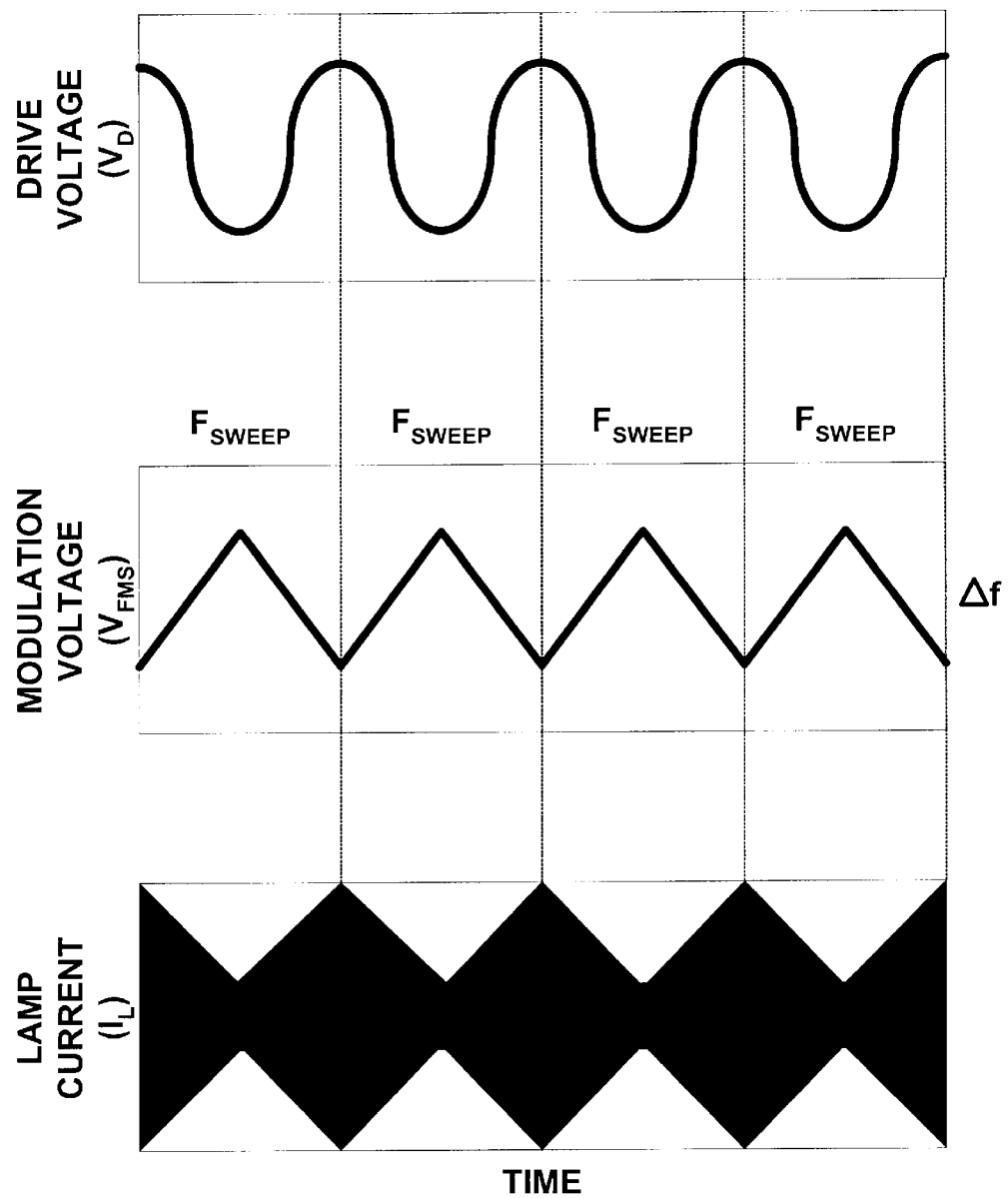
FIG. 9 illustrates a fifth set of exemplary graphs of the drive voltage, the modulation voltage, and the lamp current.

FIG. 9 illustrates a fifth embodiment of drive voltage $V_D$ having an amplitude modulation and a frequency (e.g., 120 Hz) and modulation voltage $V_{FMS}$ having a frequency modulation $\Delta f$ (e.g., k5 Hz) and a frequency sweep $F_{sweep}$ (e.g., 200 Hz) in deriving lamp current $I_L$.

While the embodiments of the present invention disclosed herein are presently considered to be preferred, various changes and modifications can be made without departing from the spirit and scope of the present invention. The scope of the present invention is indicated in the appended claims, and all changes that come within the meaning and range of equivalents are intended to be embraced therein.

We claim:

1. A method of operating a half-bridge coupled to a gas discharge lamp, said method comprising:

operating the half-bridge to establish an operating frequency of a lamp current above all acoustic resonances within a high frequency operation range of the gas discharge lamp; and operating the half-bridge to apply a frequency modulation to the operating frequency.

2. A method of operating a half-bridge coupled to a gas discharge lamp, said method comprising:

operating the half-bridge to establish an operating frequency of a lamp current; and operating the half-bridge to apply an amplitude modulation to the lamp current in response to a reception by the half-bridge of a drive voltage having a waveform.

3. A method of operating a half-bridge coupled to a gas discharge lamp, said method comprising:

operating the half-bridge to establish an operating frequency of a lamp current above all acoustic resonances within a high frequency operation range of the gas discharge lamp;

operating the half-bridge to apply a frequency modulation to the operating frequency; and operating the half-bridge to apply an amplitude modulation to the lamp current in response to a reception by the half-bridge of a drive voltage having a waveform.

4. A method of operating a half-bridge coupled to a gas discharge lamp, said method comprising:

operating the half-bridge to provide a lamp current to the lamp during a start-up operation of the gas discharge lamp; and operating the half-bridge to establish the lamp current at an operating ampere level during an arc heating phase of the gas discharge lamp, the operating ampere level being equal to or greater than a minimum run-up ampere level to thereby impede any back-arcing within the gas discharge lamp whereby the gas discharge lamp substantially achieves a color specification for the gas discharge lamp.

5. The method of claim 4, further comprising:

operating the half-bridge to establish an operating frequency of the lamp current during a stable operation of the gas discharge lamp, the operating frequency being above all acoustic resonances within a high frequency operation range of the gas discharge lamp; and operating the half-bridge to apply a frequency modulation to the operating frequency.

6. The method of claim 4, further comprising:

operating the half-bridge to establish an operating frequency of the lamp current; and operating the half-bridge to apply an amplitude modulation to the lamp current in response to a reception by the half-bridge of a drive voltage having a waveform.

7. The method of claim 4, further comprising:

operating the half-bridge to establish an operating frequency of the lamp current during a stable operation of the gas discharge lamp, the operating frequency being above all acoustic resonances within a high frequency operation range of the gas discharge lamp;

operating the half-bridge to apply a frequency modulation to the operating frequency; and operating the half-bridge to apply an amplitude modulation to the lamp current in response to a reception by the half-bridge of a drive voltage having a waveform.

8. The method of claim 4, wherein the operating ampere level of the lamp current during an arc heating phase of the gas discharge lamp is at least 85% of the maximum ampere level for the lamp current.

9. A half-bridge coupled to a gas discharge lamp, said half-bridge comprising:

means for establishing an operating frequency of a lamp current above all acoustic resonances within a high frequency operation range of the gas discharge lamp; and means for applying a frequency modulation to the operating frequency.

10. A half-bridge coupled to a gas discharge lamp, said half-bridge comprising:

means for establishing an operating frequency of a lamp current; and means for applying an amplitude modulation to the lamp current in response to a reception by the half-bridge of a drive voltage having a waveform.

11. A half-bridge coupled to a gas discharge lamp, said half-bridge comprising:

means for establishing an operating frequency of a lamp current above all acoustic resonances within a high frequency operation range of the gas discharge lamp;

means for applying a frequency modulation to the operating frequency; and means for applying an amplitude modulation to the lamp current in response to a reception by the half-bridge of a drive voltage having a waveform.

12. A half-bridge coupled to a gas discharge lamp, said half-bridge comprising:

means for providing a lamp current to the lamp during a start-up operation of the gas discharge lamp; and means for establishing the lamp current at an operating ampere level during an arc heating phase of the gas discharge lamp, the operating ampere level being equal to or greater than a minimum run-up ampere level to thereby impede any back-arcing within the gas discharge lamp whereby the gas discharge lamp substantially achieves a color specification for the gas discharge lamp.

* * * * *